Figure 1:
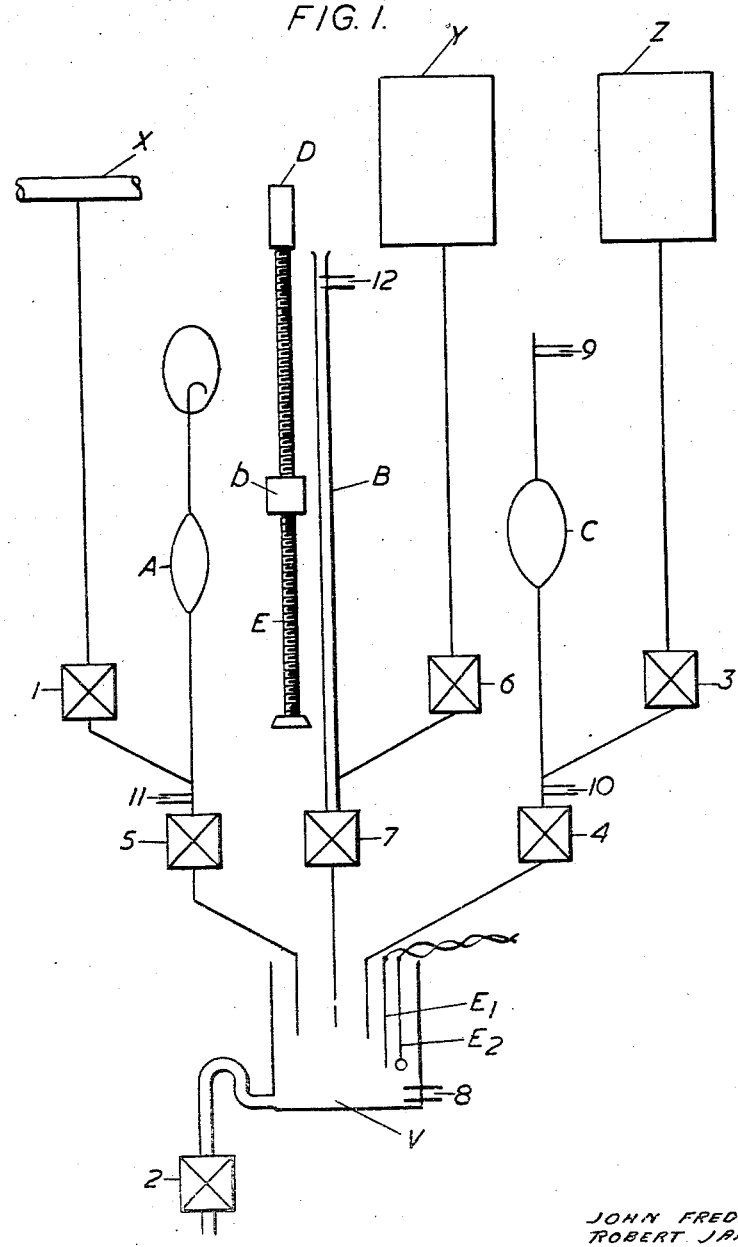

Aug. 23, 1960　　　J. F. BROWN ET AL　　　2,950,177
APPARATUS FOR THE DETERMINATION AND CONTROL
OF COMPOSITIONS IN CHEMICAL PROCESSES
Filed Feb. 21, 1957　　　　　　　　　　　　　8 Sheets-Sheet 2
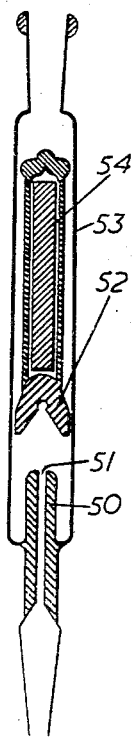
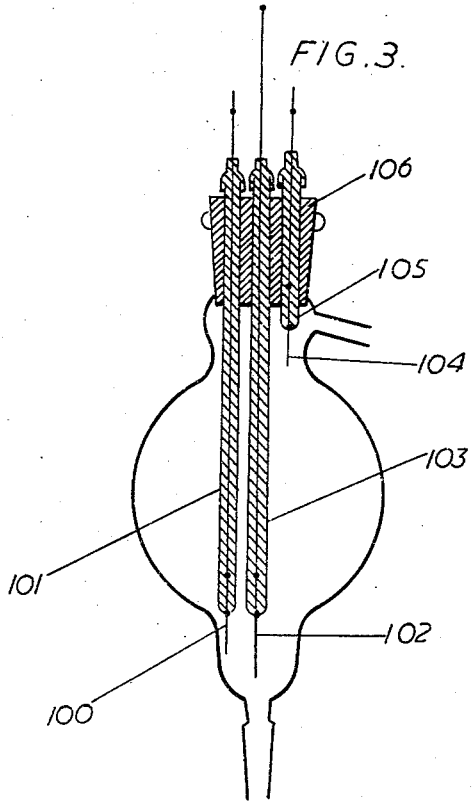
Inventors
JOHN FREDERICK BROWN
ROBERT JAMES WEIR
ANTHONY ROBERT WHELAN
By
Cushman, Darby & Cushman
Attorneys

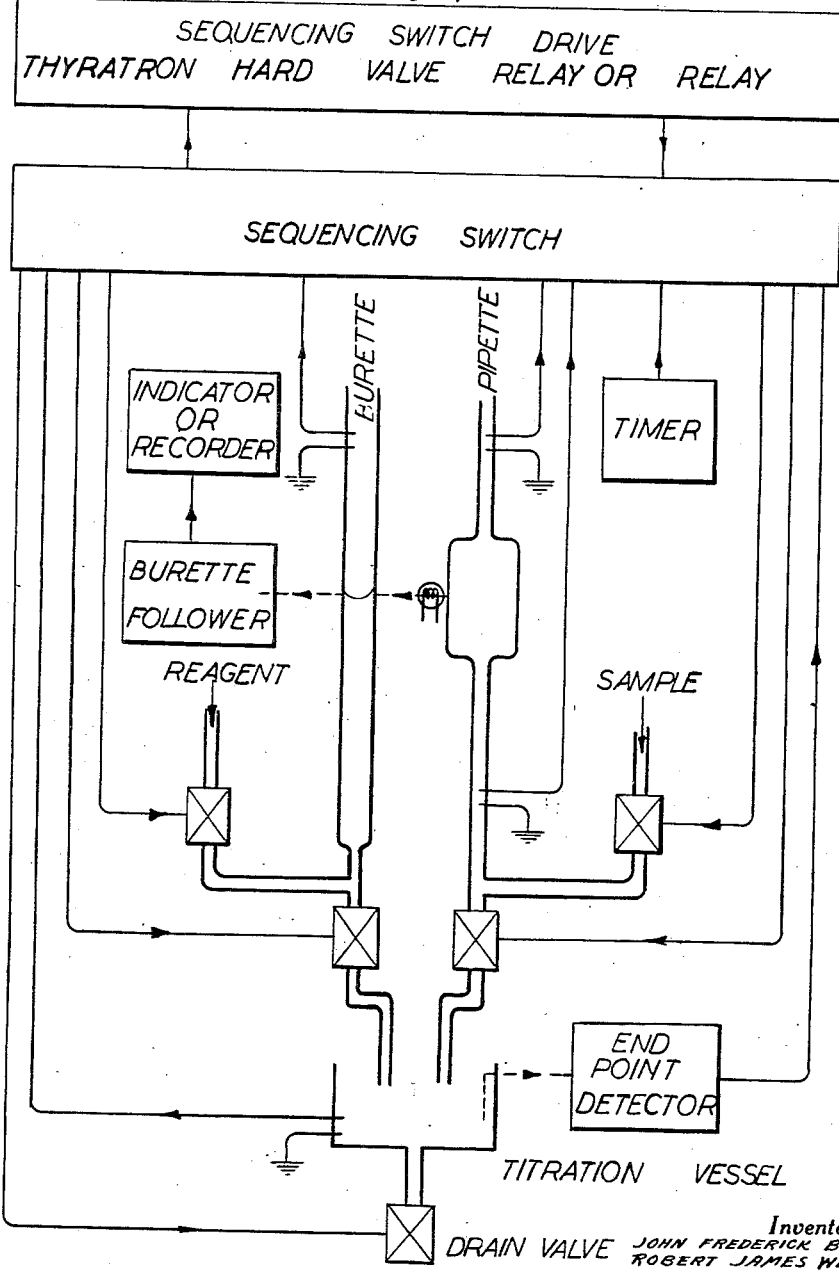

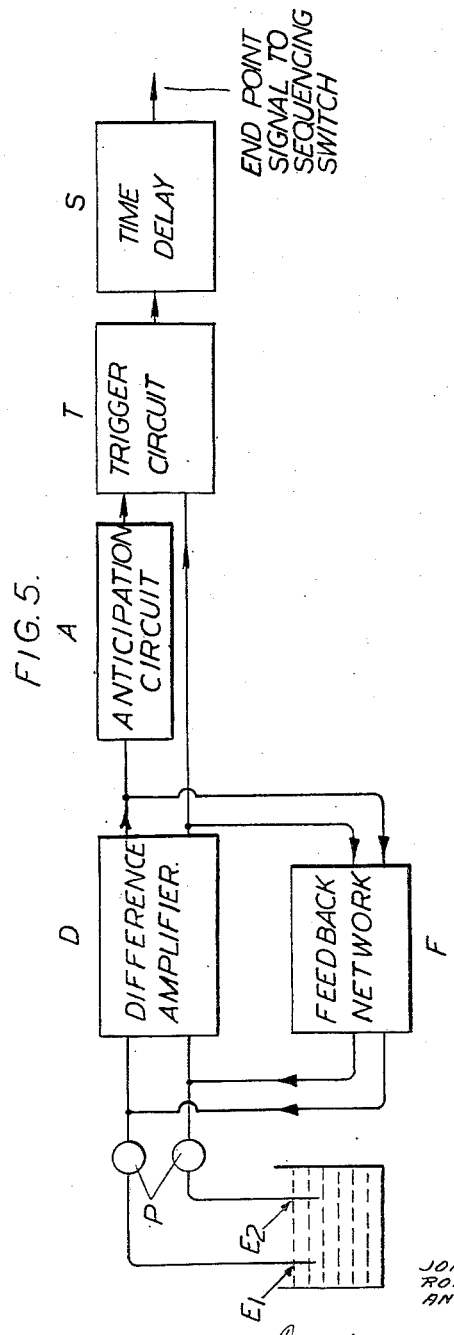

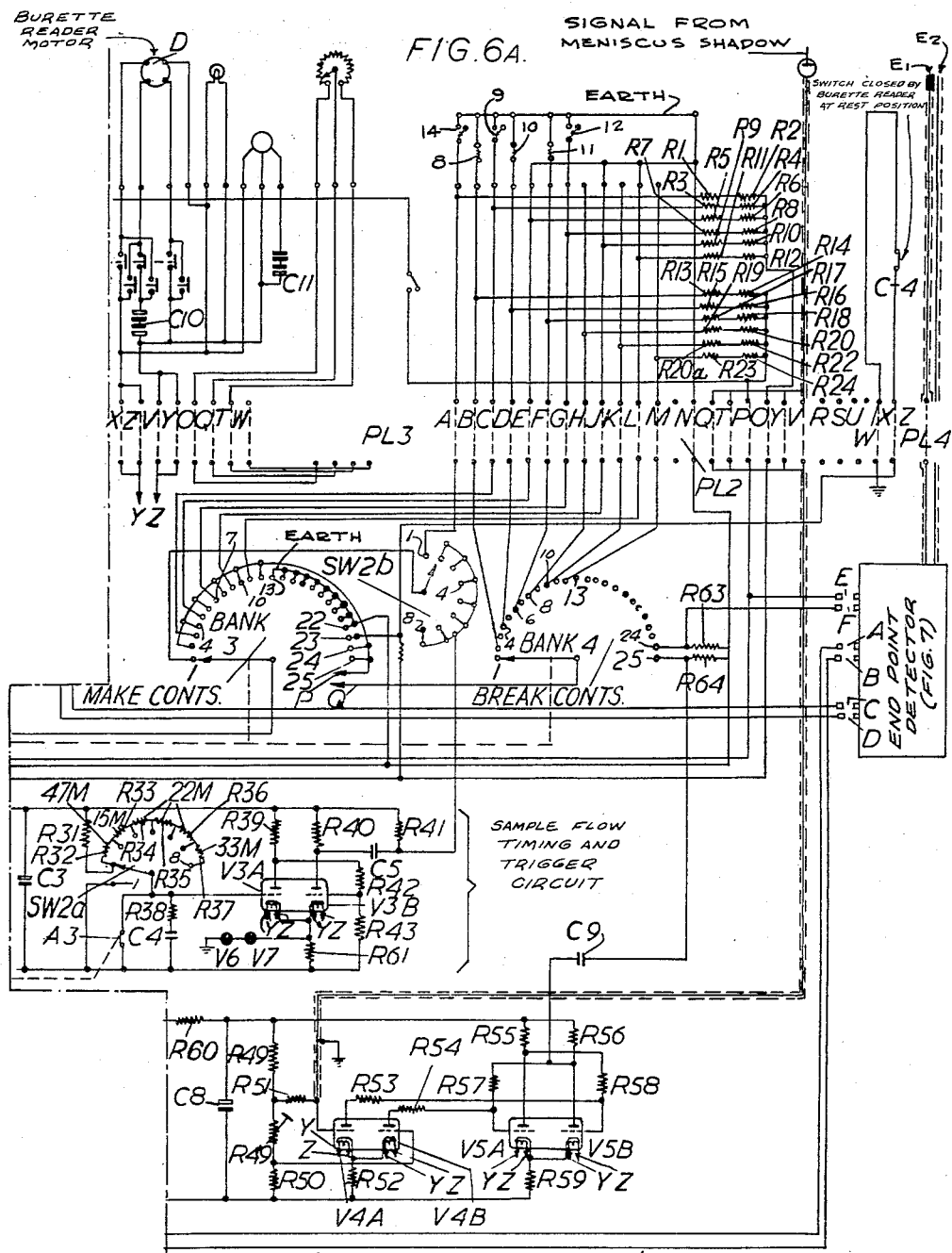

Aug. 23, 1960     J. F. BROWN ET AL     2,950,177
APPARATUS FOR THE DETERMINATION AND CONTROL
OF COMPOSITIONS IN CHEMICAL PROCESSES
Filed Feb. 21, 1957                              8 Sheets-Sheet 7
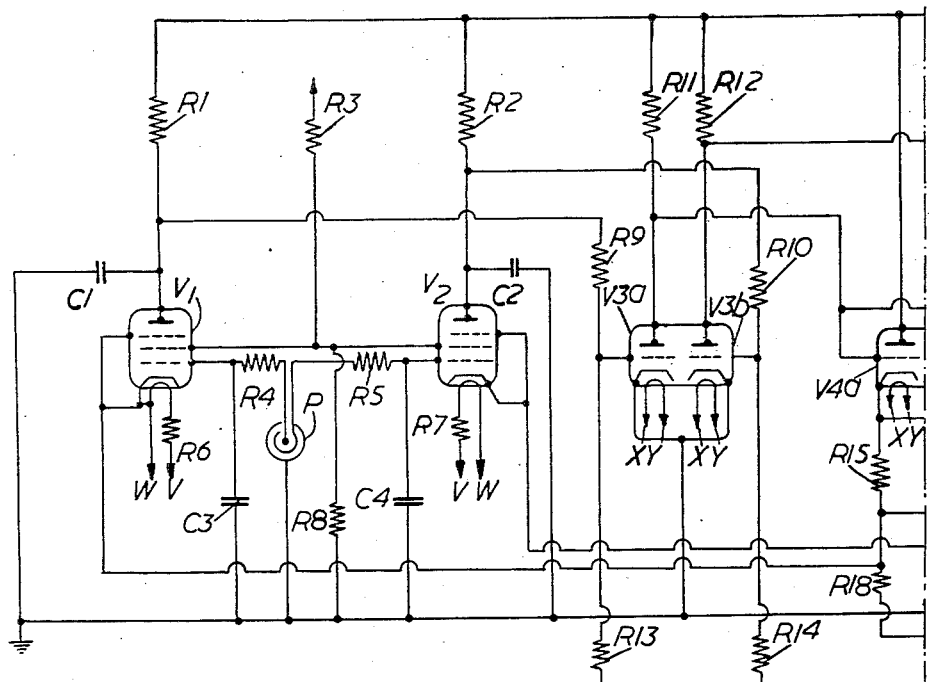
FIG.7.
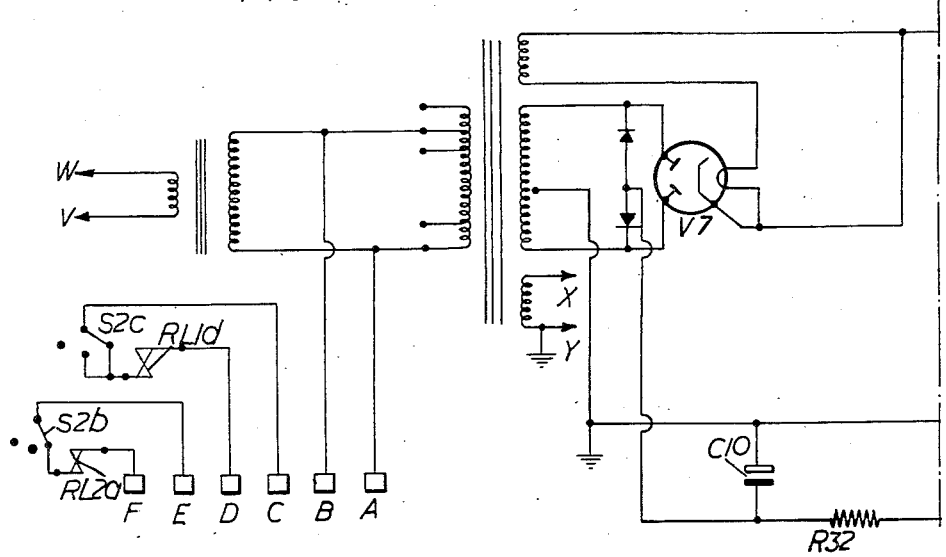
Inventors
JOHN FREDERICK BROWN
ROBERT JAMES WEIR
ANTHONY ROBERT WHELAN
By Cushman, Darby & Cushman
Attorneys

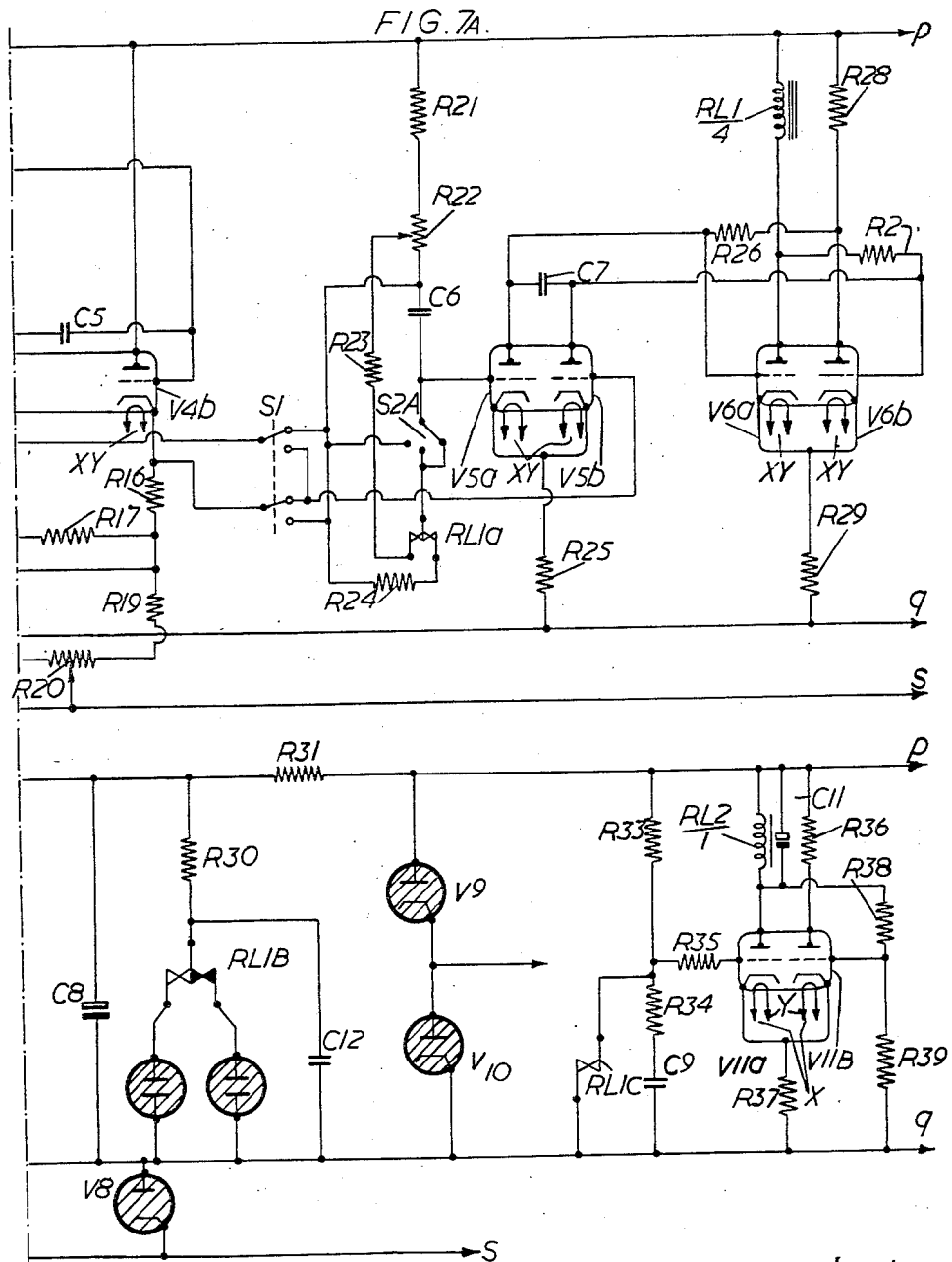

United States Patent Office 2,950,177
Patented Aug. 23, 1960

2,950,177

APPARATUS FOR THE DETERMINATION AND CONTROL OF COMPOSITIONS IN CHEMICAL PROCESSES

John Frederick Brown, Robert James Weir, and Anthony Robert Whelan, all of Norton-on-Tees, England, assignors to Imperial Chemical Industries Limited, London, England, a corporation of Great Britain Filed Feb. 21, 1957, Ser. No. 641,749

Claims priority, application Great Britain Feb. 27, 1956

23 Claims. (Cl. 23—253)

This invention relates to the determination and control of composition in chemical processes, particularly by means of automatic titration.

While several semi-automatic titrators have been developed for laboratory use, no completely automatic unit of high accuracy has been available. Attempts to make completely automatic units for plant use have not previously met with much success. In some of these the sequence of operations has been controlled by a timing mechanism but this suffers from the disadvantage that a fault in any one operation will not stop the unit, because the timer continues to function.

According to the present invention there is provided apparatus adapted for the automatic determination and indicating or recording of the concentration of an electrolyte in a liquid comprising in combination: a titration vessel provided with electrical liquid level detectors, with an electrically controlled draining valve, with stirring means, and with an end point detector cum an associated electrical circuit capable of sending electrical signals and including an anticipating sub-circuit, a trigger sub-circuit, and a time-delay sub-circuit; at least one titrating burette provided with an electrical liquid level detector, and with electrically controlled inlet and outlet valves; a liquid level finder with a co-operating indicator or recorder; a sequencing switch having a number of configuration for bringing into play as required a number of electrical circuits operating the said electrically controlled valves; a driving agent for the sequencing switch comprising a relay; the arrangement and co-ordination of the electrical circuits being such that the driving of the sequencing switch through the said driving agent is initiated by timely electrical signals originating from the detectors of the burette or burettes, titrating vessel, or the end point detector, and that at a predetermining stage of titration anterior to, and without overshooting of, the end point the anticipating subcircuit comes into play to control the trigger sub-circuit in such manner that the latter triggers for the purpose of causing the burette to deliver titrating solution in discrete additions at increasingly longer intervals of time between the additions until the trigger attains the time interval imposed by the time delay sub-circuit and which has been fixed to correspond to the end point.

As a preferred feature, when the end point has been reached the apparatus through the relay presents itself for a fresh titration.

The invention furnishes a process of automatic titration which affords high reproducibility, and utilises apparatus capable of being run for long periods with little interruption and with very little maintenance or attention.

The end point detector may be based on colour change, conductivity, or any other potentiometric property such as oxidation-reduction potentials, but is preferably a pH meter. The pH meter may have standard electrodes such as a normal or saturated calomel electrode used with a glass, hydrogen or silver/silver chloride electrode, etc. It is highly desirable that these electrodes should not remain uncovered with liquid for long, otherwise their "sharpness" decreases.

By "relay" in this specification is meant any apparatus operating on the principle of a small electrical power controlling a larger electrical power, for example a thyratron, a hard valve relay, an electromagnetic relay or a transistor. It is preferred to use a thyratron as the driving agent for the sequencing switch.

Preferably the apparatus also includes a sampling pipette, and this more preferably, is provided with at least one electrically controlled valve, and with an electrical liquid level detector. The pipette is provided with a bottom electrical liquid level detector and may be of overflow type, or may be adapted for filling to a volume defined by a second electrical liquid level detector. The sampling pipette, like the other titrating components, is operated by electrical signals from its liquid level detector initiating movement of the sequencing switch to bring into play a circuit of circuits operating its electrically controlled valve(s).

Preferably also the apparatus includes a pipette for adding a diluent to reduce the concentration of the solute in the liquid being titrated. This is of similar design to the sampling pipette.

The elements of the apparatus and their combination may be such that: (1) once the sample has been manually introduced to the titrating apparatus the titration proceeds automatically to the end-point and then ceases; or (2) the sample is introduced automatically, the titration then proceeds automatically to the end point, and then ceases; or (3) operation is according to (1) or (2) and when the end point is reached the apparatus automatically pre-sets itself to its initial condition ready to receive the sample. In the first method of operation the initiation of the cycle may be, for example, by a manually operated means for initiating the driving agent for the sequencing switch. In an important form the aparatus is of continuous automatic type and once the apparatus is working the operations of drawing and introducing the sample, titrating to the end point, and pre-setting proceed continuously. As a further improvement the apparatus in its fuller automatic form may include an adjustable timer or timing circuit for defining how often a titration is to be performed automatically in a given time.

Preferably the liquid level detectors each comprise a pair of electrodes.

The indicating and/or recording of the liquid level in the burette can be effected in a number of ways. Thus the liquid level finder may be a follower, that is a device which measures continuously the volume of liquid which has been used in the particular titration as the liquid level moves, or a reader that is a device which simply indicates the total volume of liquid which has been used in a particular titration when it is completed.

It is preferred to use a reader comprising a photoelectric cell and an associated light source held in a carrier adapted for movement on a vertical screw, which can be motor driven. Instead of a screw, a string and pulley, or a rail or rack may be used. Alternatively, the burette may be connected to a load cell and changes in the liquid level indicated by changes in the pressure. Thirdly, the burette may be furnished with two electrodes or coils, which may be internal or external to it, and the difference in liquid level indicated by changes in the resistance or capacitance between or associated with them. The electrodes may be parallel to the burette tube, and may be located either inside or outside it. Either direct, or high or low frequency, current may be used in the resistance or capacitance circuit. Further, detection of the liquid level may be by means of changes in resistance or capacitance, which are communicated to a mechanical arrangement such as a screw, a string and pulley, a rail or a rack.

For a simple titration only one burette is needed, but two burettes may be supplied for the purpose of back titration, or a pipette and a burette.

There is shown schematically in Figure 1 of the accompanying drawings a form of apparatus suitable for a direct titration and adapted for the addition of a diluent such as distilled water, which is fitted for continuous automatic titration. The pipette A for measuring and delivering the sample to the titration vessel V is provided with magnetic valves 1 and 5 and electrical contacts 11. Preferably the upper vessel of the pipette A is also provided with electrical contacts (not shown in Figure 1, but see contacts 14 in Figures 4 and 6). The titrating burette B is supplied with a standard solution or reagent from the reservoir Y and is provided with magnetic valves 6 and 7 and electrical level contacts 12. The level of the liquid in the burette B after titration is detected by a burette reader $b$ comprising a photo-electric cell and an associated light source held in a carrier adapted for movement on the vertical lead screw E which can be driven by the motor D. We have found it most convenient to regard the "zero" position of the co-operating indicator as that corresponding to the liquid level when the burette is full, and in the following description "zero" is used with this meaning. The "rest" position of the finder is any convenient position when it is not functioning, and need not correspond to the full burette. In finding the liquid level the reader, preferably for reasons of sharpness, approaches the meniscus of the liquid from beneath. The pipette C fed from reservoir Z for delivering, if desired, a measured quantity of diluent to the vessel V, is provided with magnetic valves 3 and 4 and electrical contacts 9 and 10. If the liquid which is being titrated is of moderate concentration it may be unnecessary to use a diluent, but most frequently a diluent will be used to give a suitable reaction volume and concentration. Since a pipette of small volume can be used without sacrifice of accuracy, the amount of standard solution is reduced, and therefore the operating cost.

The titrating vessel V is provided with a magnetic drain valve 2, electrical contacts 8, an end point detector (not shown) such as a pH meter with electrodes $E_1$ and $E_2$ and a mechanical stirrer not shown. A glass stirrer of propeller type is suitable. For some titrations stirring of the liquid may be effected by blowing an inert gas through the liquid.

A suitable magnetic valve is the novel form shown in Figure 2 in which 50 is the valve seat, provided with an orifice 51, and 52 the valve head integral with the plunger 53 which is provided with a soft iron core 54. The plunger, head, and seat may be composed of any suitable inert material such as glass. The valve is electrically motivated, for example by an iron shrouded coil of 5000 turns of 36 B.S.W.G. enamelled wire energized by 50 volt A.C. The angle of the conical or frusto-conical head may be 55° to 65°, preferably 60°, and the seat has a substantially spherical convex surface. This combination gives great accuracy, apparently because of the small area of contact between the head and the seat, and the self-grinding action of the valve. Preferably there is a cavity, suitably of spherical shape, at the top of the conical or frusto-conical hole.

The liquid level contacts are an important and novel feature of the invention because if accuracy and reproducibility are to be obtained, the contacts must react sharply to the liquid level. We have found that preferably they should have a resistance of at least 10,000 ohms when the path is broken. The greatest difficulty to overcome in obtaining this is shorting through filming of the electrolyte either across the contact points or over the walls of the vessel. It is preferred to employ two vertical conductors, e.g. of platinum encased in an insulator, such as glass, to within a few millimetres of the contact points. Other metals which may be used are those of the platinum group, e.g. rhodium, gold, and for some uses silver. Other insulators are polythene and polytetrafluorethylene. The contacts are fed with alternating current in order to minimise the effect of electrolysis and, for the same reason as well as for safety, the voltage preferably should not exceed 25 volts. Preferably, there is an earth line, also of platinum encased in glass. This eliminates interference, especially when the titrating vessel is earthed. It is also advantageous when the burette tip dips into the liquid, in order to give good draining of the burette. It also makes for safety.

A form of contact suitable for a diluent pipette is shown in Figure 3, but the contacts are similar in each of the vessels. The "break" contact comprises a platinum electrode 100 carried in a glass support 101, and an earth electrode 102 carried in a glass support 103. The "make" contact comprises a platinum electrode 104 carried in a glass support 105 and the same earth electrode. The three electrodes are mounted in a stopper of insulating material 106, for example of polythene.

An electromagnetic valve of the type described is preferred, but other kinds may be used; for example one based on electro- or magneto-strictive principles, such as a transducer and a mechanical link, e.g. a bow spring or over-centre spring, operating the valve proper.

Figure 4 is a block schematic drawing of the titrator and when read in conjunction with Figure 1 illustrates the interrelations of: the various signals, their origins, the sequencing switch, the thyratron etc. which drives it, the electro-magnetic valves, the measuring vessels, the titration vessel with its end point detector, the burette follower or reader and the indicator/recorder. For simplicity in Figure 4 only the burette and one pipette are shown.

The timing circuit shown in Figure 4 is a resistance/capacity network and serves to define the period for which the sample flows through the sampling pipette without a titration being performed and therefore the frequency with which the instrument performs titrations. It may for example be set at any time interval between 1 and 30 minutes, or at more or less than this, depending on process or plant requirements. It may also be arranged so that it can be cut out when electrical level contacts are used in the upper part of the sampling pipette.

Figure 5 is a block schematic drawing of a preferred form of pH end point detector. The P.D. from the electrodes $E_1E_2$ is fed via convenient sockets and plugs P to the difference amplifier D provided with a feed back network for nullifying the effect of stray voltages common to the electrodes, and the resulting amplified voltage is fed through an anticipating circuit A, to a trigger circuit T, comprising two valves and including a relay, and the associated time delay circuit S.

The function of the anticipating circuit A, which does not come into play until a predetermined pH value has been reached, is thereafter to control the trigger circuit T in a pattern governed by the output from the difference amplifier D, such that the trigger circuit relay is actuated (in the present case de-energized) for increasingly longer time intervals as the end point is approached. Each signal from the trigger circuit goes through the sequence switch which is being held in the same position, and thus motivates the burette magnetic valve 7. The trigger circuit at each transition operates a relay controlling a time delay electronic circuit S which may be set to trigger at any desired time interval, for example 30 seconds. When the interval between the transitions of the trigger circuit T becomes sufficiently long, which takes place at the end point, the time delay circuit S sends out the end point signal and this initiates the movement of the sequence switch to its next position, whereupon the burette reader *b* commences to move in order to detect the titration value.

Figure 6:
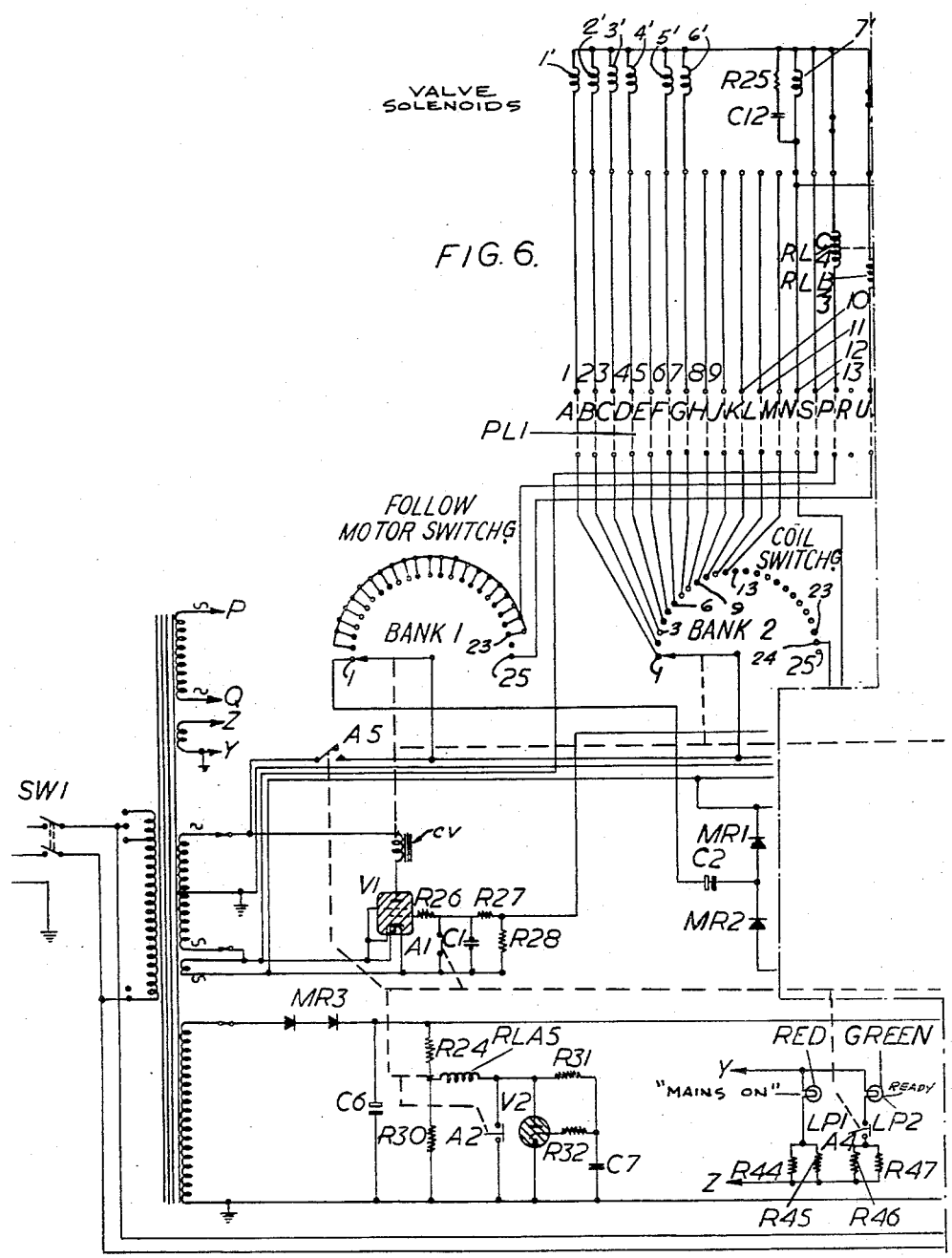

The complete sequence of operations in a preferred form of automatic titrator comprising 8 operations in number may be gathered from the following description read with reference to Figures 1, 4, and 6, which refers to the titration of an alkali such as aqueous ammonia with a standard solution of aqueous hydrochloric acid. The sequencing switch shown in a Uniselector which has four banks of 25 contacts numbered as shown, each bank having its separate wiper and the wipers being geared together. The electrical connections and paths can be gathered from Figure 6 wherein the make and break electrical contacts for the pipettes, burettes and vessel of Figure 1 are given the same respective numbers, and wherein the solenoids for the magnetic valves of Figure 1 are given the same respective numbers followed by a prime mark.

OPERATION I

All the magnetic valves except 1 are closed, the titrating vessel V is full from the previous titration, the sample stream is flowing through and overflowing the pipette A, the timer is on and after the pre-set interval, a pulse is fed to the thyratron which moves the Uniselector wiper to the second position.

OPERATION II

The following actions occur:
(*a*) Valve 1 is closed;
(*b*) The burette reader *b* starts to move towards the rest position;
(*c*) Magnetic valve 2 opens and the titrating vessel V empties via the siphon until the liquid level breaks the path between the electrical contacts 8, and this break initiates movement of the wiper to the third position of the Uniselector.

OPERATION III

Magnetic valve 2 shuts and magnetic valve 3 opens. The diluent then flows from the reservoir Z, which has a constant head device (not shown), into pipette C until the level reaches and completes the path between the electrical contacts 9, thus initiating the movement of the wiper to the fourth position of the Uniselector. The burette reader continues if necessary to move towards its "rest" position during Operation III.

OPERATION IV

Magnetic valve 3 shuts and magnetic valve 4 opens. The diluent is then delivered from the pipette C into the vessel V until the level falls to, and breaks the path between, the electrical contacts 10, thereby initiating movement of the wiper to the sixth position of the Uniselector, the fifth position having been passed over as will be later described. The burette reader continues if necessary to move towards its rest position during Operation IV.

OPERATION V

Magnetic valve 4 shuts and magnetic valve 5 opens. The sample flows from the pipette A into the vessel V until the level falls and breaks the path between electrical contacts 11, thereby initiating movement of the wiper to the seventh position of the Uniselector. The burette reader continues if necessary to move towards its rest position during Operation V.

OPERATION VI

Magnetic valve 5 shuts, magnetic valve 6 opens and standard solution flows from the reservoir Y, provided with a constant head device (not shown) into the burette B until the level rises and completes the path between the electrical contacts 12, thereby initiating movement of the wiper from the seventh progressively to the twenty third position of the Uniselector as will be later explained. The burette reader continues to move to its rest position during Operation VI.

OPERATION VII

Valve 6 shuts. No further action in this operation can occur until the burette reader *b* has returned to its rest position. When this has occurred the wiper moves to the twenty fourth position of the Uniselector, and the magnetic valve 7 opens, allowing the reagent to flow into the vessel V. The pH of the solution is implicitly determined throughout the titration. Near the probable end point—preset, as already described, on the basis of a number of previous observations, and usually at about 90% or more of the full titration value— the anticipating circuit of the pH detector comes into play and thereafter the addition of the standard solution from the burette via magnetic valve 7 is made in small increments and with provision of time intervals (which gradually increase as the difference signal from the difference amplifier diminishes) between the additions sufficient to permit the electrodes and solution in the titration vessel to reach equilibrium. The last time interval is set at 30 seconds' duration, which has been found to be adequate and when this point is reached a pulse is sent from the time delay circuit S to the Uniselector, which causes the wiper to move into the twenty fifth position of the Uniselector which in turn prevents magnetic valve 7 from being re-energized again.

OPERATION VIII

Magnetic valve 7 has previously closed, and the burette reader *b* ascends the burette until stopped by the interposition of the meniscus between the photo-electric cell and its light source. This liquid level is indicated on the recorder, which is suitably calibrated. Simultaneously, on stopping, the reader sends a pulse to the Uniselector, and the wiper moves to the first position, whereupon magnetic valve 1 opens, the timer is switched on, and a fresh cycle of operations commences. Preferably the first bank of the Uniselector has a bridging wiper in order to prevent the relay (RLC; see Fig. 6) becoming wrongly de-energized.

Typical operating conditions used for the continuous automatic titration of aqueous ammonia were:

|  | Mls. |
|---|---|
| Amount of diluent (tap water) delivered by pipette C | 100 |
| Amount of sample (10-normal aqueous ammonia) | 1.25 |
| Typical titration (N aqueous HCl) | 12.0 |
| Equivalent recorder reading | 56.0 | pH end point, pH 4.

On this particular instrument observation on 40 titrations of constant samples having identical strength showed a mean titration value of 12.03 mls. and the standard deviation was ±0.05 mls., that is ±0.5%. If desired the pH meter may be temperature compensated, but even without this refinement, it has been found that the end point has been constant to within about ±0.2 pH unit over several days' running.

Advantages of the instrument are that:
(1) Its accuracy compares favourably with and may even be better than that of ordinary manual titration;
(2) It is capable of operating continuously under plant conditions with the minimum of maintenance;
(3) Titrations can be done substantially continuously with greater frequency and at a lower cost assuming the same use of reagents, than heretofore by manual methods.

With reference to (3) a complete titration cycle takes about 5 minutes plus the time during which the sample is streaming through the sample pipette. If this time is set at 2 minutes about 8 titrations can be done per hour.

Suitable electronic circuits for use according to the invention are shown in Figures 6 and 7 of the accompanying drawings.

Automatic titrator circuit

This, as already indicated, comprises essentially a sequencing switch and a motivating element therefor, which is preferably a thyratron. The advantages of a thyratron over other relays, such as hard valve relays, are its simplicity, substantial freedom from mechanical contact troubles, high current capacity, and general robustness. Choice of thyratron type is governed by the characteristics of the sequencing switch actuator. A gas filled thyratron has the advantages that it reaches its normal operating temperature rapidly and is adapted for use within wide temperature ranges.

Referring to Figure 6, the thyratron V1 is fed with an alternating anode voltage derived from a transformer and is normally held non-conducting by a bias voltage, for example the heater supply voltage. The integrator R27, C1 eliminates stray pick-up which might trigger the thyratron V1. On being triggered by a signal the thyratron V1 operates the sequence switch actuator which comprises an electromagnet CV.

It is necessary that the thyratron should attain its suitable operating temperature before it is allowed to pass current, and this is achieved by the introduction of a time delay circuit comprising R31, C7 and the trigger valve V2, in conjunction with relay RLA/5. V2 is a neon-filled cold cathode triode. C7 charges through R31 until the trigger-cathode gap breaks down and the anode-cathode gap follows, thus energizing the relay. This opens relay contacts A1 which while closed allowed the thyratron to heat up but prevented the application of any possible grid signal triggering the thyratron V1. Energizing relay RLA/5 closes its switch A2 which acts to hold the relay energized. Switch A5 is also then closed and provides voltage for the solenoids of the magnetic valves and to the electric contacts. When RLA/5 is energized, its switch A3 in the sample flow timing circuit opens to allow timing to begin as later described, and switch A4 closes energizing green lamp LP2 to indicate that the apparatus is ready to begin titrating. Thus, no part of the titrating circuits can be energized until the thyratron is operative.

The action of the circuit shown in Figure 6 will now be illustrated in detail for the filling and emptying of a pipette according to Operations III and IV, which involve the functioning of contacts 9 and 10 and the shutting and opening of magnetic valves 3 and 4. (The references are to Figures 6 and 1.)

*Operation III.*—This commences with the Uniselector moving under the effect of the thyratron V1 and sequence switch actuator CV from position 2 to position 3. The supply for the solenoid 2' (Figure 6) of the magnetic valve 2 (Figure 1) is cut off and transferred to the solenoid 3' of magnetic valve 3 by means of bank 2 on the Uniselector. Thereupon diluent flows from the reservoir Z into the pipette C. Simultaneously the grid of thyratron V1 has been transferred from electric contacts 8 to electric contacts 9 via banks 3 and 4 of the Uniselector. The circuit connecting electric contacts 9 to thyratron V1 control grid comprises: resistors R26, R27; bank 3 wiper; and bank 3, No. 3 contact. Resistor R4 and the pre-set variable resistor R3 energize the electric contacts 9, which normally are open, that is, broken. The center tapped secondary winding and the filament secondary winding are wound in the same relative direction as shown by the sine waves near their ends, but since R3 and R4 are connected to the bottom sides of the filament secondary winding the thyratron control grid receives a potential of such phase and magnitude relative to its anode-cathode voltage as to hold the thyratron non-conductive while contacts 9 are open. When the electrical contacts 9 are closed by the liquid rising in the pipette C the thyratron grid is connected directly to earth via bank 3, thereby placing the control grid of the thyratron V1 at a properly phased potential for firing. Thereupon V1 conducts and through the action of the actuator CV the Uniselector wiper leaves position 3 to position 4, thus switching off the electrical contacts and the magnetic valve 3.

*Operation IV.*—This corresponds to Uniselector wiper position 4. When the wiper reaches position 4 the magnetic valve 4 is opened by virtue of the energization of solenoid 3', 4' and the pipette C empties into the titrating vessel V. Simultaneously electrical contacts 10 are connected to the control grid of thyratron V1 via: resistors R26 and R27; bank 3, No. 4 contact; winding PQ: bank 4 wiper; and bank 4, No. 4 contact. Resistor 16 and the pre-set variable resistor R15 energize the electrical contacts 10, which normally are closed, that is, made. The center tapped secondary winding and winding PQ are oppositely wound to provide potentials which are 180° out of phase with each other as shown by the sine waves. When the bank 4 wiper is on its contact No. 4, the Q side of winding PQ is connected to earth while liquid level contacts 10 are closed. The voltage coupled to the thyratron grid at such times is therefore substantially that from winding PQ, but since the resulting grid-cathode voltage is out of phase with the anode-cathode voltage of the thyratron, the thyratron does not fire. When the electrical contacts 10 are opened by the liquid level falling in pipette C, winding PQ is no longer earthed and its voltage is effectively vectorially added to that from the upper end of the center tapped secondary winding through R15 and R16 to effect a resulting voltage which is of proper phase and magnitude relative the anode-cathode voltage of the thyratron V1 for firing thereof. This causes V1 to conduct, and thereupon the Uniselector wiper moves from position 4.

The functioning of the circuits for the other operations is very similar to that just described and may be gathered from the following brief description read in connection with Figures 6 and 1.

*Operation I.*—This corresponds to position 1 of the Uniselector wiper. The solenoid valve 1' is energized through bank 2 of the Uniselector to fill the sample pipette, and the sample flow timing circuit associated with V3 is energized through bank 1. The signal causing movement of the Uniselector wiper to position 2 is derived either from the timing circuit associated wtih R31, C4 and switch SW2a or from a set of electrical contacts 14 located in the upper part of the sampling pipette A in Figure 1 (similar to the contacts 9 associated with R and R2 in Figure 6) applied through switch SW2b and bank 3 to the thyratron V1.

*Operation II.*—This corresponds to Uniselector wiper position 2. In this operation solenoid valve 2' is energized through bank 2 of the Uniselector to drain the beaker. The burette reader b is energized through bank 1 and relay RLC/4 so that it moves towards its rest position. This movement continues through Operation II unless, and until, the rest position is reached. The signal to move the Uniselector wiper to position 3 is given by the liquid breaking of electrical contacts 8 (Figures 1 and 6) associated with R13 and R14 (Figure 6) and is applied through bank 4 and bank 3 of the Uniselector to the thyratron V1.

*Operations III and IV.*—These have been described in detail above.

*Operation V.*—This corresponds to Uniselector wiper position 6, position 5 having been passed over by reason of the shorting of resistance R5 to earth. On wiper position 6 the solenoid valve 5' is energized through bank 2 and the sample pipette A is emptied. The burette reader remains energized through bank 1, and relay RLC/4 and continues to move towards the rest position throughout Operation V unless, and until, the rest position is reached.

The signal to move the Uniselector wiper to position 7 is given by the opening of electrical contacts 11 (Figures 1 and 6) associated with resistors R17 and R18 (Figure 6) and is fed to the thyratron V1 through banks 4 and 3 of the Uniselector.

*Operation VI.*—This corresponds to Uniselector wiper position 7. On this position solenoid valve 6' is energized through bank 2, contact No. 7, to fill the burette. The burette reader $b$ remains energized through bank 1 and relay RLC/4 and continues to move towards rest throughout the operation unless, or until, the rest position is reached.

The signal to move the Uniselector wiper from position 7 is given by the closing of electrical contacts 12 (Figures 1 and 6) associated with resistors R7 and R8 (Figure 6) and is fed to the thyratron V1 through bank 3. When contacts 12 are joined by the rising liquid level, i.e. when the burette is full, the phase and amplitude of the potential appearing on the grid of thyratron V1 are changed, and the thyratron conducts. The Uniselector is then moved to the next position (8) and the solenoid 6' is deenergized to close valve 6 (Figure 1).

*Operation VII.*—This corresponds to position 24 of the Uniselector wiper, positions 8 to 22 having been passed over. This passing over is effected by shorting resistors R9, R11 to earth and arranging that the contact positions associated with each of resistors R19, R20$a$ and R23 are left open circuit and that the Uniselector contacts 13 to 22 inclusive on bank 3 are connected to earth.

The burette reader $b$ is energized through bank 1 and relay RLC/4 and continues to move while the wiper moves through positions 8 to 22 unless or until the rest position is reached. The wiper remains on position 23 until the burette reader reaches the rest position and contact C–4 is made, thereby connecting contact 23 of bank 3 to earth so as to cause thyratron V1 to conduct whereupon the Uniselector moves to position 24.

On Uniselector wiper position 24, solenoid 7' (Figure 6) for magnetic valve 7 is energized and de-energized several times through the end point detector via terminals C and D and bank 2 of the Uniselector to allow incremental amounts of solution from burette B to be added into vessel V during the energized times while the de-energized times gradually increase in duration until the end point is detected as later described in detail.

*Operation VIII.*—This corresponds to position 25 of the Uniselector wiper. The burette reader $b$ is energized for reading purposes through bank 1 and relay RLB/3 and moves from rest until the meniscus, which is used as the index of liquid level, is reached. The signal produced by the shadow of the meniscus is fed into the trigger circuit comprising valves V4 and V5 (see Figure 6) and their associated elements, and the output from the trigger circuit is fed via condenser C9 and resistor R64 through banks 4 and 3 to the thyratron V1, which causes the Uniselector wiper to move to position 1. The same cycle of operations is then repeated.

The time delay circuit controlling the frequency with which titrations are performed will now be described. If desired one titration cycle could be made to follow immediately after another by the wiper moving from position 1 to position 2 on the Uniselector through the use of an upper set of contacts in pipette A (not shown in Figure 1 but shown as contacts 14 in Figures 4 and 6). However, continuous titration of this sort is seldom needed and so a time delay circuit is included in the preferred form. A suitable time delay circuit (see Figure 6) comprises as main elements a switched resistance R31–R37 and a capacitor C4 forming a time constant. This circuit is connected to a grid of valve V3 which forms part of a trigger circuit. Valve V3 triggers, therefore, a predetermined time after the RC time constant circuit first receives a signal from position 1 of bank 1; then, the potential of the anode of V3B rises and this rise is transmitted through switch SW2B, bank 3 contact 1, wiper 3, resistors R27 and R26 to the grid of the thyratron V1. This causes V1 to conduct and through the action of the actuator CV, the Uniselector wiper moves to position 2, whereupon Operation II commences.

The electronic circuit which controls the behaviour of the burette reader will now be described. When the wiper moves onto position 25 of the Uniselector the burette reader $b$, including photocell and light source, is motored up the burette. (There is a circuit from bank 1 of the Uniselector to the relay RLB/3 for starting the motor D.) When the shadow of the meniscus falls on the photocell the photocell current decreases and alters the P.D. between the grids of V4A and V4B of Figure 6. When this P.D. reaches a predetermined value V5 undergoes a transition and a signal from V5B anode is sent through condenser C9, resistor R64, contact 25 bank 4, bank 4 wiper, winding PQ, contact 25 bank 3, bank 3 wiper, resistors R27 and R26, to the grid of thyratron V1. This causes the thyratron V1 to conduct and through the action of the actuator CV, the Uniselector wiper moves to position 1. Simultaneously the burette motor, which was moving, is switched off. The burette motor operates the recorder circuit independently of the Uniselector.

*End point detector circuit*

This circuit is applicable to any type of end point detector giving potentiometric signals.

It comprises the following sub-circuits: (1) a difference amplifier D with feed back; (2) a trigger sub-circuit T, preferably including an anticipating sub-circuit A; (3) a time-delay sub-circuit S; and (4) a stabilised power supply, and is shown in Figure 7 of the accompanying drawings, which is to be read in conjunction with Figures 1 and 5. In referring to Figure 7 in this description the elements are denoted by a capital letter followed by a suffix or suffixes. The voltage from the electrodes $E_1E_2$ of Figure 5 is fed to the detector through plugs and sockets P shown in Figure 5 and also in Figure 7.

*Difference amplifier*

This comprises two amplifying pentodes $V_1$ and $V_2$ and second stage amplifiers $V_{3a}$ and $V_{3b}$ with their accompanying time constants $R_4C_3$, $R_5C_4$ and load resistors $R_1$, $R_2$, $R_{11}$, $R_{12}$. A suitably amplified difference voltage is thus applied between the cathodes of valve $V_4$. Feedback voltages are taken from the junction of $R_{15}$ and $R_{18}$ and also from the junction of $R_{16}$ and $R_{19}$ and are fed back to the cathodes of the pentodes $V_1$ and $V_2$ respectively.

The feedback network F comprising resistors $R_{15}$, $R_{18}$, $R_{20}$, $R_{16}$, $R_{19}$, $R_{17}$ is designed to give a greater amplification to potential differences between the control grids of pentodes $V_1$ and $V_2$ than is given to potential differences between $V_1$ and $V_2$ control grids and earth. A suitable initial amplification is for example about 2000, which is reduced by feedback to about 40 for voltages between $V_1$ and $V_2$ grids, and to about 1.4 for voltages between $V_1$ and $V_2$ grids and earth. In this manner the effect of stray potential pick-up common to both pH electrodes is minimised.

*Anticipation sub-circuit A*

The potential difference between the cathodes of $V_4$ of Figure 7 is preferably fed through a change-over switch $S_1$ to a trigger circuit, which latter arrangement permits titration in both directions, that is acid→alkali, or alkali→acid.

The titration is interrupted at a predetermined pH value before the end point is reached because of the voltage developed across condenser $C_6$ as determined by the setting of potentiometer R22, condenser $C_6$ being charged through resistor 23 while the single pole, double throw relay switch contacts RL1$a$ are closed to the left. This voltage is superimposed on the output voltage from the difference amplifier D and the resultant voltage difference is fed to the grids of valve $V_5$. Basically, the difference amplifier produces between the V4 cathodes a potential which is a function of the pH in vessel V. $R_{20}$ is initially set so that this potential difference is substantially zero at the desired end point. The anticipation circuit $C_6$, $R_{21}$–$R_{24}$, $RL1a$ supplements or adds to the output from V4 so that V5 triggers before the output from V4 reaches zero. When the P.D. between the V5 grids reaches (i.e., decreases to) a first predetermined value, it initiates the trigger circuit comprising valves $V_5$, $V_6$ and RL1, and the latter by being deenergized thereby actuates (deenergizes), through its switch contacts $RL1d$ and bank 2 of the Uniselector, the solenoid 7', thereby closing magnetic valve 7 of the burette when the Uniselector is in position 24. The burette is thus stopped and condenser $C_6$ is discharged by resistor $R_{24}$ via the newly closed contacts $RL1a$ until the P.D. between the grids of $V_5$ reaches a second predetermined value, and thereupon initiates the trigger circuit T, so opening the magnetic valve 7 again. This alternation continues until condenser $C_6$ is completely discharged, which point corresponds to the completion of the titration.

*Trigger sub-circuit T*

This consists of a balanced amplifier $V_5$ feeding a trigger valve $V_6$ in one anode of which is a relay coil RL1. The relay RL1 is preferably of slow-operate fast-release type. Normally this relay is energized, but when the P.D. between the grids of valve $V_5$ falls to its predetermined value, as already mentioned, that half valve which was cut off passes current and causes a change in the potential difference applied to the grids of valve $V_6$. The grids of valve $V_6$ have positive feedback applied to them from the anodes of valve $V_6$, thus giving $V_6$ two stable states. The signal from valve $V_5$ determines which half of valve $V_6$ is conducting, and therefore the position of the relay RL1/4 switch contacts $RL1a$, $RL1B$, $RL1C$ and $RL1d$. The $RL1a$ contacts operate in the anticipation circuit to allow charge and discharge of $C_6$, and contacts $RL1d$ open with deenergization of the relay to control magnetic valve 7, all as previously explained.

*Time delay sub-circuit S*

The signal from valve $V_6$, through relay RL1 is not sent to thyatron V1 to cause the Uniselector to move from position 24 to position 25 until the magnetic valve 7 of the burette finally stays closed for a fixed time interval, e.g. 30 seconds. The measurement of such a time interval is provided by the time delay circuit comprising condenser $C_9$ resistor $R_{33}$ and the trigger valve $V_{11}$. The delay is provided by the opening of RL1C when relay RL1/4 is deenergized whereupon the condenser $C_9$ is charged through resistor $R_{33}$. If condenser $C_6$ in the anticipation circuit discharges sufficiently in conjunction with the pH differential voltage at the cathodes of V4 so as to trigger V5 and V6 and energize relay RL1/4 before $V_{11}$ can be triggered by the increasing charge on condenser $C_9$, condenser $C_9$ will no longer be charging but will discharge via resistor R34 and the newly closed relay switch contacts RL1C to earth. However, if relay RL1/4 is not re-energized by the time C acquires a predetermined charge, i.e., before the voltage between the grids of $V_{11}$ reaches a predetermined value, $V_{11}$ will trigger and energize relay RL2/1 which then closes its switch contacts RL2a. This contact closing causes, when switch S2b is in its illustrated position, a signal via terminals E and F (Figures 6 and 7) resistor R63, bank 4, contact 24, winding PQ and bank 3 to thyatron V1, thereby moving the Uniselector from position 24 to position 25 for actuation of the burette reader as previously described.

The power supply for the pH detector comprises conventional bi-phase rectifiers and neon stabilisers for both negative $s$–$q$ and positive $p$–$q$ supplies; unstabilised heater supply X—Y for valves $V_{11}$ and $V_3$–$V_7$ inclusive; and a stabilised heater supply V—W for $V_1$ and $V_2$.

Lamps indicating whether the burette value is on or off are provided below the single pole double throw switch contacts RL1B of relay RL1/4, and the potentiomer $R_{20}$ in the cathode circuit of V4 (Figure 7) has a calibrated dial to enable pH values to be read off visually.

When the end point detector is based on colour change, for example of an indicator substance dissolved in the solution, then a photo-electric cell with an associated light source is used for sending the potentiometeric signal to the specified electrical circuit.

When the end point detector is based on oxidation/reduction potentials, then the potentiometric signal is fed directly to the above specified electrical circuit. In this case a platinum and a glass/calomel electrode can, for example, be used. It is arranged that the trigger circuit triggers at a predetermined E.M.F. and the anticipating circuit comes into play at a predetermined E.M.F.

Alternatively, if the end point is detected by means of high frequency conductivity then the amplitude of the oscillation is measured and fed to an electrical circuit comprising the following sub-circuits which are each similar to those already described, viz. an anticipating sub-circuit, a trigger sub-circuit, a time-delay sub-circuit and a differentiator provided with a bias which limits the trigger circuit so that overshooting of the end point cannot occur.

A preferred form of burette has been described, but a plunger type of burette can also be used and has advantages under some conditions, particularly, for example, when handling organic liquids which are non-conductors. With a plunger-burette valves of precision automatic type are not required and simple mechanically operated valves will do. A suitable plunger-burette comprises a vertical cylinder provided with a piston and having an inlet line for filling which includes an electrically controlled valve and enters the cylinder at or near its bottom, an outlet line situated near the top of the cylinder including an electrically controlled valve, and a vertical delivery tube projecting centrally from the bottom of the cylinder and having a capillary portion. The arrangement is such that the valve on the outlet line closes when the burette is to be refilled so that no sucking back of the liquid occurs when the plunger rises. Conveniently the plunger can be read directly on a scale by means of a lever system. On Operation VII the piston returns to its initial position, the valve on the inlet line to the cylinder is opened, and the burette is ready for titrating. Indication that the burette is empty or filled can be made by an electrical switch located on the plunger, or by means of the resistance or capacitance methods already described in relation to the burette.

A plunger type sampling device may also be used, especially for non-electrolytes, which conveniently is filled to an overflow point.

According to a further feature of the invention there is provided a method for the automatic determination and indicating or recording of the concentration of an electrolyte in a given liquid which comprises the following steps conducted automatically in suitable sequence: filling at least one burette, which has a liquid level finder, with a standard solution, titrating a sample of the given solution in a titrating zone with the standard liquid while being agitated and decreasing the rate of addition of the standard liquid towards the end of the titration, which is indicated by an end point detector in the titrating zone, recording the amount of standard liquid use, automaticity being effected by means of a sequencing switch having a number of configurations for bringing into play as required a number of electrical circuits, which if desired may include relays, operating electrically controlled valves controlling flow into and from the burettes and flow from the titrating zone, driven by a relay, the driving of the sequencing switch through the said relay being initiated by timely electrical signals originating from liquid level detectors situated in the burettes or titrating zone, from the end point detector or from the burette level finder, the decrease in the rate of addition of the standard liquid being effected at a predetermined stage of titration by means of a circuit comprising an anticipating sub-circuit, a trigger sub-circuit, and a time delay sub-circuit whereby at the said stage of titration the anticipating sub-circuit comes into play and the trigger sub-circuit triggers causing the burette to deliver titrating liquid at increasingly longer intervals of time until the trigger attains the time interval imposed by the time delay circuit which has been fixed and corresponds to the end point of the titration.

As a further feature the invention provides an electrical circuit adapted for use in automatic titration which comprises a differential amplifier which rejects in-phase and accepts anti-phase incoming signals, a separate anticipating sub-circuit operating on the output from the differential amplifier, a trigger sub-circuit, and a time delay sub-circuit controlled by the said trigger sub-circuit.

We claim:

1. Automatic titration apparatus comprising a titrating vessel containing a titrand, at least one titrating burette containing a titrant, said burette having an electrically controlled valve through which said titrant may flow into said vessel, two electrodes at least one of which is immersed in said titrand, a difference amplifier including at least two amplifying elements each having at least one control element, said electrodes being coupled respectively to the control elements, said amplifier having two outputs the potential difference therebetween being the potential difference between said two electrodes as amplified by said amplifier, bistable circuit means having two inputs and at least one output, means including a condenser for coupling one of the outputs of said amplifier to one of the inputs of said bistable means, means for coupling the other amplifier output to the other input of said bistable means, means for charging and discharging said condenser including relay means coupled to the output of said bistable means, means for energizing said valve, and means associated with said relay means for effecting energization of said valve so said titrant flows therethrough when the bistable means is in one of its stable states and for preventing energization thereof when the bistable means is in its other stable state, said condenser being charged while the bistable means is in said one state and being discharged while the bistable means is in said other state, said bistable means being changed from said one state to the other when the combination of the condenser charge and said potential difference changes to a first predetermined voltage level and being changed from the other state to said one state when said combination changes to a second predetermined voltage level, the arrangement being such that said bistable means stays in said one state and titrant flows into said vessel until said potential difference changes to a value which in combination with said condenser charge equals said first predetermined voltage level whereupon the bistable means changes to said other state, titrant flow ceases, and the condenser discharges until said second voltage level is reached at which time the bistable means changes back to said one state and a discrete quantity of titrant flows while the condenser charges and the said potential difference changes to cause said first voltage level to be reached again, the alternation of the bistable means between its two states continuing until said second voltage level can no longer be reached.

2. Apparatus as in claim 1 and further including feedback means coupled to said amplifier for nullifying the effect of any stray voltages associated with said electrodes.

3. Apparatus as in claim 1, wherein said valve is an electromagnetic valve comprising a valve seat and a floating valve head having a magnetic core.

4. Apparatus as in claim 1 and further including means for precluding further energization of said valve after said bistable means remains in said other state for a predetermined time.

5. Apparatus as in claim 4 wherein the energization precluding means includes a timing circuit coupled to said relay means and operable to measure time only when the bistable means is in said other state, and means including second relay means coupled between the valve energization means and said timing circuit for receiving a signal from the latter when said predetermined amount of time has been measured.

6. Automatic titration apparatus comprising a titration vessel, a titrating burette having a high liquid level detector and a first electrically controlled valve, means including a second electrically controlled valve for filling said burette with a titrant, a pipette having a third electrically controlled valve for depositing a titrand into said vessel and having a low liquid level detector, a sequencing switch having a plurality of banks each with a plurality of positions, means coupled to said banks and responsive to a stepping signal from a first of the banks for stepping said switch banks in unison from one position to another, means for electrically operating said first, second and third valves coupled respectively to different positions of a second of said banks, means for coupling the burette liquid level detector to one position on said first bank, means for coupling the pipette liquid level detector to one position on a third bank of said sequencing switch, and means coupled to said one position on each of the first and third banks for causing a stepping signal in response to the respectively associated liquid level detectors respectively detecting high and low liquid levels, the arrangement being such that when said sequencing switch is in a first position, the third valve is electrically energized to cause said titrand to flow into the vessel until the titrand reaches a low level in said pipette at which time the low level detector thereof effects a stepping signal whereby the sequencing switch is moved to a second position, said second valve being then electrically connected to effect filling of said burette to a high level at which time the burette liquid level detector effects another stepping signal whereupon the sequencing switch steps to a third position for electrically energizing said first valve to allow the titrant in the burette to flow into said vessel, two electrodes at least one of which is immersed in the liquid in said vessel and having a potential difference therebetween which progressively changes in one direction as more titrant is added to the titrand, bistable circuit means having two inputs and at least one output, means including a condenser for coupling one of the electrodes to one of the inputs of said bistable means, means for coupling the other electrode to the other input of said bistable means, means for charging and discharging said condenser including relay means coupled to the output of said bistable means, the means for coupling said first valve to said third position of said second bank including means associated with said relay means for allowing energization of the first valve when the bistable means is in one of its stable states and for preventing energization thereof when the bistable means is in its other stable state, said condenser being charged while the bistable means is in said one state and being discharged while the bistable means is in said other state, said bistable means being changed from said one state to the other when the combination of the condenser charge and said potential difference changes to a first predetermined voltage level and being changed from the other state to said one state when said combination changes to a second predetermined voltage level, the further arrangement being such that said bistable means stays in said one state to allow titrant to flow into said vessel until said potential difference changes to a value which in combination with said condenser charge equals said first predetermined voltage level whereupon the bistable means changes to said other state for a first time, titrant flow ceases, and the condenser discharges until said second voltage level is reached at which time the bistable means changes back to said one state and a discrete quantity of titrant flows while the condenser charges and the said potential difference changes to cause said first voltage level to be reached again which changes the bistable means to said other state for a second time longer than said first time, the alternation of the bistable means between its two states being continued to add a discrete quantity each time the bistable means is in said one state, while the time duration of the bistable means in said other state increases progressively until such time that said second voltage level can no longer be reached.

7. Apparatus as in claim 6 wherein at least one of said valves is an electromagnetic valve including a valve seat and a floating valve head having a magnetic core.

8. Apparatus as in claim 6 wherein the means for stepping said sequencing switch includes a relay.

9. Apparatus as in claim 8 wherein said relay includes a thyratron.

10. Apparatus as in claim 6 wherein the means for coupling said electrodes respectively to the inputs of said bistable means further includes a difference amplifier comprising at least two amplifying elements each having at least one control element, said electrodes being connected respectively to the control elements, said amplifier having two outputs the potential difference therebetween being the potential difference between said two electrodes as amplified by said amplifier, one of said outputs being coupled by the condenser to one of the inputs of said bistable means, and the other output of the amplifier being coupled to the other input of the bistable means.

11. Apparatus as in claim 10 and further including feedback means coupled to said amplifier for nullifying the effect of any stray voltages associated with said electrodes.

12. Apparatus as in claim 6 and further including means for precluding further energization of said first valve after said bistable means remains in said other state for a predetermined time.

13. Apparatus as in claim 12 wherein the energization precluding means includes a timing circuit coupled to said relay means and operable to measure time only when the bistable means is in said other state, and means including second relay means coupled between the first valve and said timing circuit for receiving a signal from the latter when said predetermined amount of time has been measured.

14. Apparatus as in claim 12 wherein the energization precluding means is coupled to said third position of said third bank of the sequencing switch and causes a stepping signal after the bistable means is in said other state for said predetermined time.

15. Apparatus as in claim 14 and further including a liquid level finder movable along the length of said titrating burette for producing a liquid level reading signal when the finder is at the same height as the liquid level in said burette, said last mentioned stepping signal being effective to cause said sequencing switch to move to a fourth position, said liquid level finder being coupled to the fourth position of a fourth bank of the sequencing switch for causing movement of the finder along the burette when the sequencing switch is in said fourth position, and means coupled to the liquid level finder for producing another stepping signal in response to said reading signal whereupon the sequencing switch moves to another position.

16. Apparatus as in claim 15 and further comprising means for filling said pipette including a fourth electrically controlled valve, a fifth electrically controlled valve associated with said titration vessel as a drain valve, said titration vessel having a low liquid level detector, said another position of a sequencing switch being the fifth position thereof, means for electrically operating said fourth valve being coupled to the said fifth position of said second bank of the sequencing switch and means for electrically operating said drain valve being coupled to a sixth position of said second bank, said low level liquid detector for said vessel being coupled to a sixth position of said third bank of said switch, means coupled to the said fifth position of said first bank for providing a stepping signal to cause the sequencing switch to move to its said sixth position, and means responsive to the detection by the vessel liquid level detector of a low liquid level for causing a stepping signal the arrangement being such that said pipette is filled while the sequencing switch is in its said fifth position and during its said sixth position the vessel is emptied, the vessel low level liquid detector thereupon effecting a stepping signal to effect movement of the sequencing switch to another position.

17. Apparatus as in claim 16 wherein the means for causing a stepping signal to move said sequencing switch from its fifth to its sixth position includes a high level liquid detector associated with the pipette.

18. Apparatus as in claim 16 wherein the means for causing a stepping signal to effect movement of the sequencing switch from its fifth to its sixth position includes a timing circuit.

19. Apparatus as in claim 16 and further including a second pipette having high and low liquid level detectors, means for filling said second pipette including a sixth electrically controlled valve for allowing flow of the pipette liquid into said vessel, said last mentioned another position being a seventh position of said sequencing switch, means for energizing said sixth valve coupled to the corresponding seventh position of said second bank of the sequencing switch, means for energizing said seventh valve coupled to an eighth position of said second bank, means coupling the high level liquid detector for said second pipette to the corresponding seventh position of said first bank of the sequencing switch and means coupling the low level liquid detector for the second pipette to the corresponding eighth position of said third bank of said sequencing switch, the arrangement being such that the second pipette is filled while the sequencing switch is in its seventh position and the high level liquid detector for the second pipette causes a stepping signal when the second pipette is full, whereupon the sequencing switch moves to its eighth position and said seventh valve is energized to allow flow of the liquid from said second pipette into said vessel, the second pipette low level liquid detector being operative to cause another stepping signal when the liquid in said second pipette reaches a low level.

20. Automatic titration apparatus comprising a titrating vessel containing a titrand, at least one titrating burette containing a titrant, said burette having an electrically controlled valve through which said titrant may flow into said vessel, means associated with the fluid in said vessel for producing potentiometric signals indicating by their difference the difference in said fluid from a predetermined titration end point, a difference amplifier for amplifying the difference between said potentiometric signals, actuation means for opening and closing said burette valve, and means including an anticipation circuit coupled between said difference amplifier and said actuation means for controlling the latter, said anticipation circuit including means responsive to the amplified potentiometric signal difference to cause the actuation means to close said valve before the difference in the amplified potentiometric signals changes to a predetermined value corresponding to said end point and for causing the actuation means to open said valve if the difference between the amplified potentiometric signals does not reach said predetermined value while said valve is closed.

21. Automatic titration apparatus comprising a titrating vessel containing a titrand, at least one titrating burette containing a titrant, said burette having an elecrically controlled valve through which said titrant may flow into said vessel, means associated with the fluid in said vessel for producing potentiometric signals indicating by their difference the difference in said fluid from a predetermined titration end point, a difference amplifier for amplifying the difference between said potentiometric signals, said difference amplifier including first and second amplifying stages and means including feedback means coupled to both said stages for reducing the over-all amplification, actuation means for opening and closing said burette valve, and means including an anticipation circuit coupled between said difference amplifier and said actuation means for controlling the latter, said anticipation circuit including means responsive to the amplified potentiometric signal difference to cause the actuation means to close said valve before the difference in the amplified potentiometric signals changes to a predetermined value corresponding to said end point and for causing the actuation means to open said valve if the difference between the amplified potentiometric signals does not reach said predetermined value while said valve is closed.

22. Automatic titration apparatus comprising a titrating vessel containing a titrand, at least one titrating burette containing a titrant; said burette having an electrically controlled valve through which said titrant may flow into said vessel, means associated with the fluid in said vessel for producing potentiometric signals indicating by their difference the difference in said fluid from a predetermined titration end point, a difference amplifier for amplifying the difference between said potentiometric signals, bistable circuit means changeable from a first state to a second state upon receipt of a first predetermined voltage level and changeable from said second state to the first state upon receipt of a second predetermined voltage level, means coupled between said difference amplifier and bistable circuit means for causing the latter to change from its first state to its second state before the amplified potentiometric signal difference reaches said first voltage level, means coupled to the output of the bistable means for causing, while the bistable means is in its first state, said burette valve to be open so that titrant flows into said vessel and effects a change in the difference between said potentiometric signals and for causing the valve to be closed while the bistable means is in its second state and including means coupled with said means between the difference amplifier and the bistable means for causing the bistable means to change back to its first state, this sequence of the bistable means changing back and forth between its states continuing automatically until the fluid in said vessel has attained said predetermined end point.

23. Automatic titration apparatus comprising a titration vessel, a titrating burette, means for detecting a relatively high liquid level in said burette, an electrically controlled valve associated with said burette for allowing liquid to flow therefrom into said vessel when the valve is open and for preventing flow when the valve is closed, means including a second electrically controlled valve for filling said burette with a titrant, a pipette having an electrically controlled valve for depositing a titrand into said vessel, means for detecting a relatively low liquid level in said pipette, a sequencing switch having a wiper contact movable to a plurality of positions, means responsive to a stepping signal for stepping said wiper contact from one position to another, means for electrically operating said burette, second, and pipette valves respectively connected to different positions of said sequencing switch, means coupled to each of said detecting means and to the switch stepping means for generating a stepping signal when the liquid associated with the respective detecting means changes to the level detected thereby, the arrangement being such that when the sequencing switch is in a first position, the pipette valve is open to allow flow of titrand into the vessel until the titrand reaches said relatively low level in the pipette at which time the detecting means therefor effects through its associated generating means a stepping signal whereby the sequencing switch is moved to a second position, said second valve being then electrically connected to effect filling of said burette to said relatively high level at which time the detecting means therefor effects through its associated generating means another stepping signal whereupon the sequencing switch steps to a third position for electrically operating said burette valve to allow the titrant to flow into said vessel, means associaed with the liquid in said vessel for producing potentiometric signals indicating by their difference the difference in said liquid from a predetermined titration end point, the potential difference between the potentiometric signals changing progressively in one direction as more titrant is added to the titrand, a difference amplifier for amplifying the difference between said potentiometric signals, the means for electrically operating said burette valve including actuation means for opening and closing the burette valve and means including an anticipation circuit coupled between said difference amplifier and said actuation means for controlling the latter, said anticipation circuit including means variably supplementing the amplified potentiometric signal difference for causing the actuation means to recurrently close said burette valve for successively longer times respectively beginning at different potentiometric signal differences as the difference in the amplified potentiometric signals progressively changes to a predetermined value corresponding to said end point and for causing the actuation means to reopen said valve recurrently if the difference between the amplified potentiometric signals does not reach said predetermined value during the respective times the burette valve is closed.

References Cited in the file of this patent

UNITED STATES PATENTS

| 2,530,326 | Daris | Nov. 14, 1950 |
| 2,621,673 | Hodgens | Dec. 16, 1952 |
| 2,666,691 | Robinson et al. | Jan. 19, 1954 |
| 2,726,670 | Staunton | Dec. 13, 1955 |
| 2,726,936 | Beruheim | Dec. 13, 1955 |
| 2,766,421 | Wait | Oct. 9, 1956 |
| 2,770,531 | Hawes et al. | Nov. 13, 1956 |

OTHER REFERENCES

Malmstadt et al.: "Anal. Chem.," vol. 28, p. 1408, et seq., September 1956.